Figure 1:
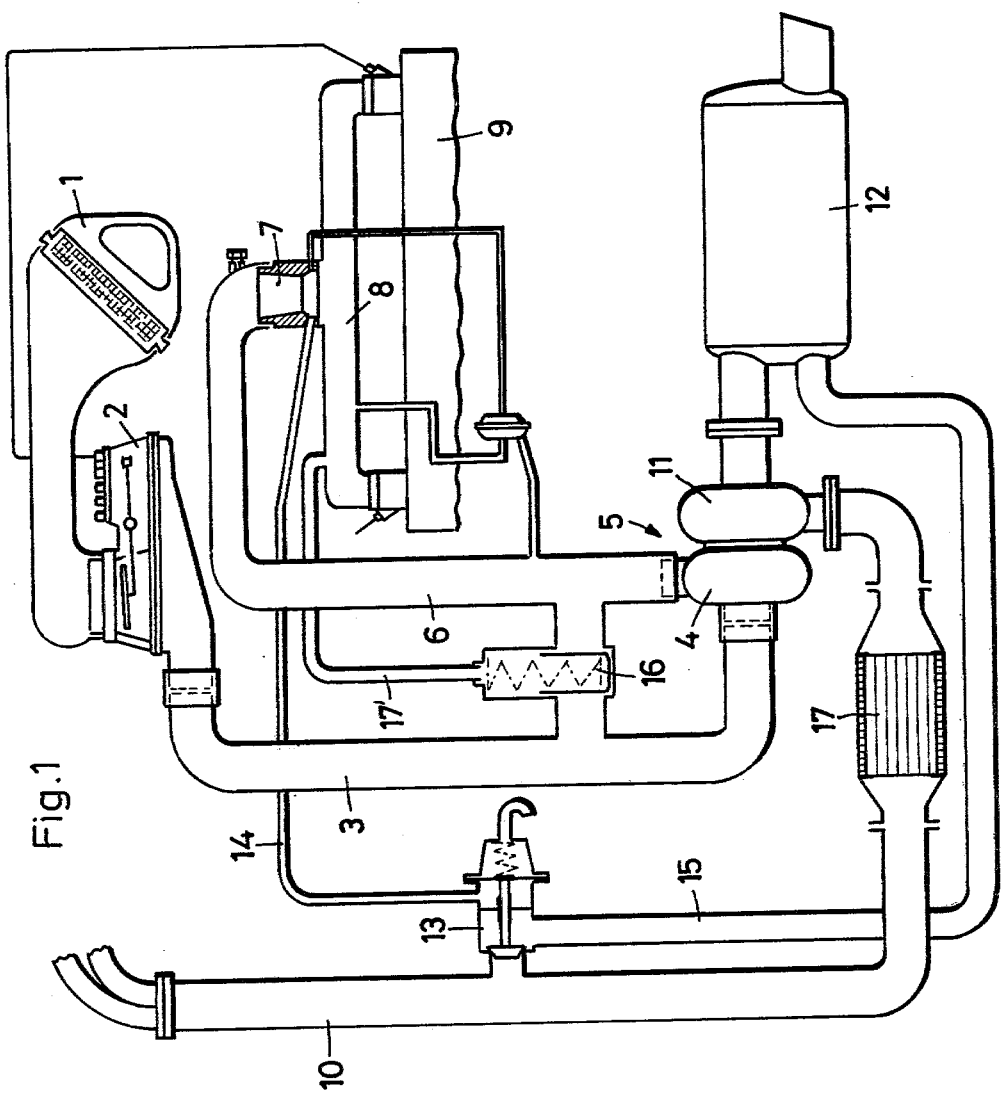

United States Patent [19]

Mezger

[11] 4,202,176
[45] May 13, 1980

[54] INTERNAL COMBUSTION ENGINE WITH AN EXHAUST GAS TURBOCHARGER FORMED BY AN EXHAUST GAS TURBINE AND BY A SUPERCHARGING BLOWER DRIVEN THEREBY

[75] Inventor: Hans Mezger, Freiberg, Fed. Rep. of Germany

[73] Assignee: Dr. Ing. h.c.F. Porsche Aktiengesellschaft, Fed. Rep. of Germany

[21] Appl. No.: 909,049

[22] Filed: May 24, 1978

Related U.S. Application Data

[63] Continuation of Ser. No. 739,027, Nov. 4, 1976, abandoned.

[30] Foreign Application Priority Data

Nov. 7, 1975 [DE] Fed. Rep. of Germany ....... 2549934

[51] Int. Cl.² .............................................. F02B 37/00
[52] U.S. Cl. ......................................... 60/600; 60/288
[58] Field of Search ................. 60/288, 600, 602, 605, 60/611

[56] References Cited

U.S. PATENT DOCUMENTS

| | | | |
|---|---|---|---|
| 2,488,563 | 11/1949 | Sills ................................. | 60/288 |
| 2,811,826 | 11/1957 | Alcock .............................. | 60/600 |
| 3,049,865 | 8/1962 | Drayer .............................. | 60/611 |
| 3,195,805 | 7/1965 | Cholvin et al. .................. | 60/602 X |
| 3,282,046 | 11/1966 | Walker et al. ..................... | 60/288 |
| 3,440,817 | 4/1969 | Saufferer .......................... | 60/288 |
| 3,868,822 | 3/1975 | Keller ............................... | 60/611 X |
| 3,961,478 | 6/1976 | Lange ............................... | 60/288 X |

FOREIGN PATENT DOCUMENTS

| | | | |
|---|---|---|---|
| 1451898 | 7/1969 | Fed. Rep. of Germany ............ | 60/611 |
| 1751061 | 3/1970 | Fed. Rep. of Germany ............ | 60/611 |

*Primary Examiner*—Michael Koczo
*Attorney, Agent, or Firm*—Craig & Antonelli

[57] ABSTRACT

An internal combustion engine with an exhaust gas turbo-charger and with a control valve arranged in the exhaust gas manifold which responds to the charging pressure of the supercharging blower; the control valve controls an exhaust gas by-pass line by-passing the exhaust gas turbine, while a catalyst is arranged in the exhaust gas manifold either upstream or downstream of the exhaust gas turbine.

2 Claims, 3 Drawing Figures

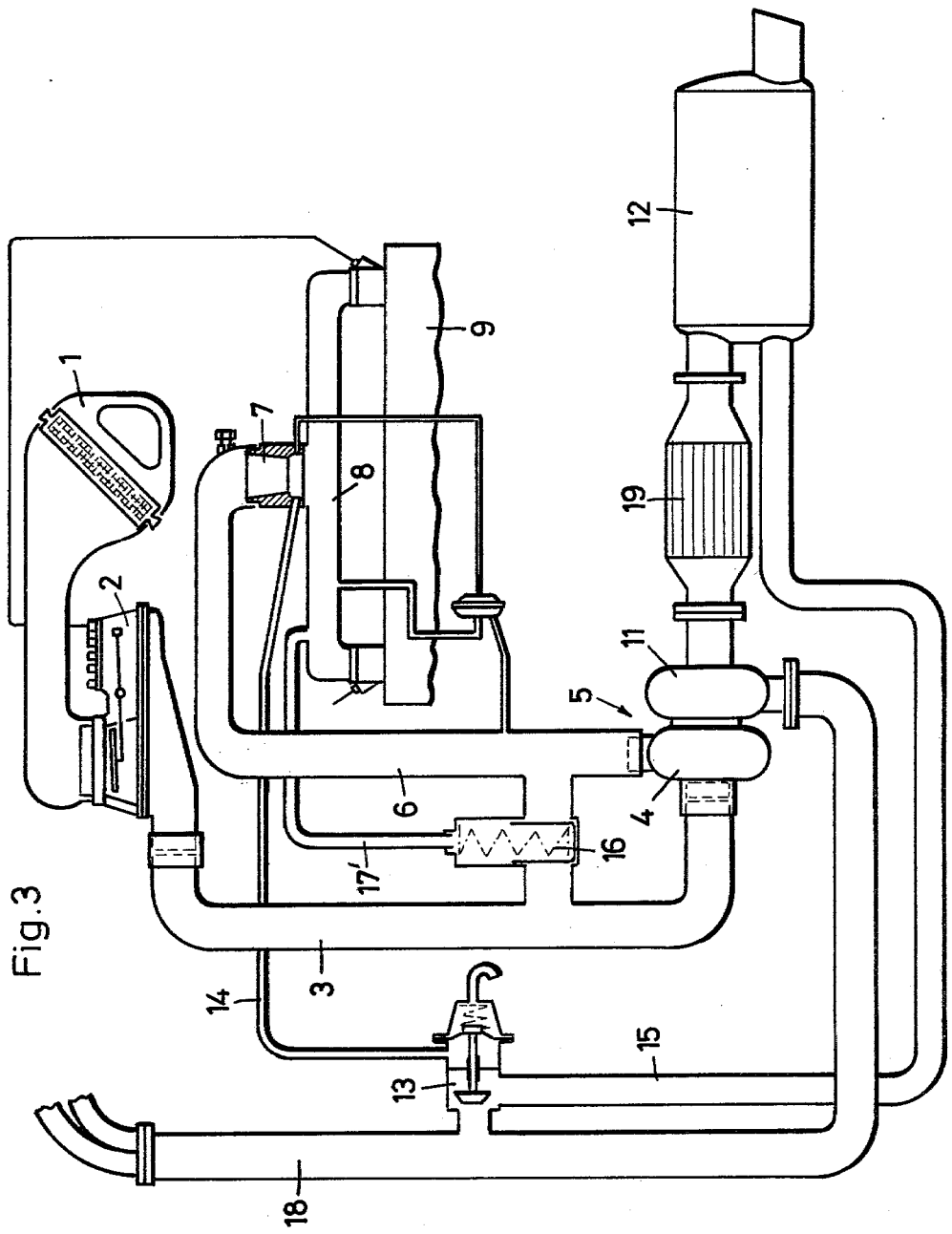

INTERNAL COMBUSTION ENGINE WITH AN EXHAUST GAS TURBOCHARGER FORMED BY AN EXHAUST GAS TURBINE AND BY A SUPERCHARGING BLOWER DRIVEN THEREBY

This is a continuation of application Ser. No. 739,027 filed Nov. 4, 1976 now abandoned.

The present invention relates to an internal combustion engine with an exhaust-gas turbo-charger formed by an exhaust-gas turbine and by a supercharging blower or compressor driven by the exhaust-gas turbine and with a control valve arranged in the exhaust-gas manifold of the internal combustion engine and responding to the charging pressure of the supercharging blower, which controls an exhaust-gas auxiliary line by-passing the exhaust-gas turbine.

Internal combustion engines with an installation for the catalytic afterburning of the exhaust-gases are known in the prior art (U.S. Pat. No. 3,037,344) which include an exhaust-gas auxiliary or by-pass line by-passing the catalyst. A throttle valve is arranged in the exhaust-gas auxiliary or by-pass line, which closes the exhaust-gas auxiliary line when the catalyst is in the normal operating ranges and which again opens the exhaust-gas auxiliary line when the catalyst is in incompatible operating ranges. This control thereby takes place in dependence on the temperature of the catalyst. The additional expenditures have thereby proved as disadvantageous which are caused by this installation for avoiding damages of the catalyst as a result of overload. Supercharged internal combustion engine with a control valve arranged in the exhaust-gas manifold of the internal combustion engine and responding to the charging pressure of the supercharging blower or compressor are also known in the art (German Offenlegungsschrift No. 1,426,076), in which the control valve controls an exhaust-gas auxiliary or by-pass line by-passing the exhaust-gas turbine. However, catalysts have not been used heretofore with such internal combustion engines.

It is the aim of the present invention to improve the exhaust emission in a supercharged internal combustion engine while avoiding the aforementioned disadvantages.

The underlying problems are solved according to the present invention in that a catalyst is arranged in the exhaust-gas manifold. It is possible thereby that the catalyst is arranged in the exhaust-gas manifold upstream of the exhaust-gas turbine or that the catalyst is arranged in the exhaust-gas manifold downstream of the turbine.

The advantage achieved with the present invention resides in particular in that the exhaust-gas emission of a supercharged internal combustion engine is improved with the use of a catalyst without necessitating additional installations for avoiding damages of the catalyst as a result of overloads. Moreover, exclusively already present structural elements are used for the solution to the underlying problem.

Accordingly, it is an object of the present invention to provide an internal combustion engine with an exhaust-gas turbo-charger comprising an exhaust-gas turbine and a supercharging blower driven by the exhaust-gas turbine, which avoids by simple means the aforementioned shortcomings and drawbacks encountered in the prior art.

Another object of the present invention resides in an internal combustion engine with an exhaust-gas turbocharger which improves the exhaust gas emission quality by structurally simple means.

A further object of the present invention resides in an internal combustion engine with an exhaust-gas turbocharger and a catalyst in the exhaust gas system which obviates the need for expensive controls to avoid damage of the catalyst.

Still another object of the present invention resides in an internal combustion engine of the type described above, in which no additional means are required to prevent damage of the catalyst as a result of overloads.

Figure 2:
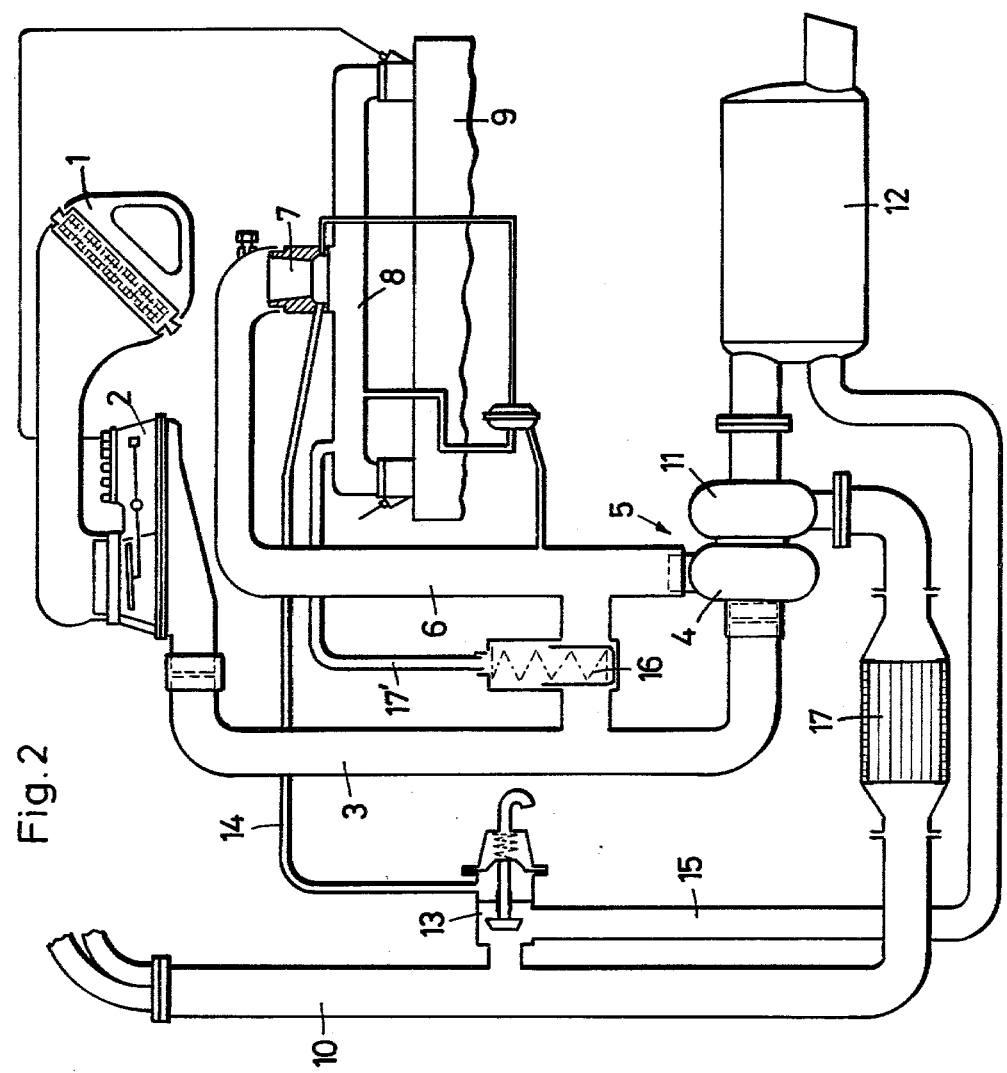

These and other objects, features and advantages of the present invention will become more apparent from the following description when taken in connection with the accompanying drawing which shows, for purposes of illustration only, two embodiments in accordance with the present invention, and wherein:

FIG. 1 is a schematic view of an internal combustion engine with exhaust-gas turbo-supercharger and with a catalyst arranged upstream of the exhaust-gas turbine in accordance with the present invention, with the exhaust-gas by-pass line in the closed condition;

FIG. 2 is a schematic view of the internal combustion engine of FIG. 1 with the exhaust-gas by-pass line in the opened condition; and FIG. 3 is a schematic view of a modified embodiment of an internal combustion engine with an exhaust gas turbo-supercharger and a catalyst arranged downstream of the exhaust-gas turbine in accordance with the present invention, with the exhaust gas by-pass line in the opened condition.

Referring now to the drawing wherein like reference numerals are used throughout the various views to designate like parts, in an internal combustion engine with a known exhaust-gas turbo-charger, the internal combustion engine sucks-in fresh air by way of the air filter 1 and the mixture regulator 2 and by way of the suction line 3, whereby the air is fed by way of the exhaust-gas turbo-charger generally designated by reference numeral 5 into the pressure line 6, the throttle valve housing 7, to the air distributor 8 and therewith to the internal combustion engine 9. The exhaust-gas stream of the internal combustion engine 9 is conducted into the atmosphere through an exhaust-gas manifold 10 by way of the exhaust-gas turbine 11 of the exhaust-gas turbo-charger 5 and the muffler 12. The exhaust-gas turbine 11 which is driven by the exhaust gas stream, in turn drives the supercharging blower or compressor 4, which supplies fresh air at a pressure above the atmospheric pressure to the internal combustion engine 9. A control valve 13 installed in the exhaust-gas line 10 controls the charging pressure of the supercharging blower 4 in that the control valve 13 is opened by the charging pressure by way of a control line 14 and the exhaust-gas stream thereby reaches directly the muffler 12 by way of the exhaust-gas auxiliary or by-pass line 15 in by-passing relationship to the exhaust-gas turbine 11. For purposes of maintaining the rotational speed of the supercharging blower 4, for example, during a pushing operation of the vehicle or in order to obtain a rapid response of the internal combustion engine 9 during the acceleration, a connecting line with a bleeder valve 16 is arranged between the suction line 3 and the pressure line 6. The bleeder valve 16 is actuated by way of a further control line 17', whereby with a closed throttle valve (not shown) the bleeder valve 16 is opened by the vacuum in the intake manifold 8 so that a circulation of the fresh air stream around the supercharging blower 4 results, whereby the supercharging blower rotational speed remains preserved. In the first embodiment of FIGS. 1 and 2, a catalyst 17 is arranged in the exhaust gas line 10 upstream of the exhaust gas turbine 11 and in the embodiment according to FIG. 3, a catalyst 19 is arranged in the exhaust-gas line 18 corresponding essentially to the exhaust-gas line 10 downstream of the exhaust gas turbine 11.

OPERATION

The operation of the present invention is as follows:

After the starting of the internal combustion engine 9, the exhaust-gas turbine 11 and therewith the supercharging blower 4 are driven by the exhaust gases thereof. By reason of the still relatively low supercharging pressure, the control valve 13 is still closed and all of the exhaust gases are conducted through the catalyst 17 or 19. If the throttle valve of the internal combustion engine 9 if further opened, then the charging pressure of the supercharging blower 4 increases. If this charging pressure reaches a predetermined value, then the control valve 13 opens the exhaust-gas auxiliary or by-pass line 15 and a portion of the exhaust-gases is exhausted in by-passing relationship of the catalyst 17 or 19 either directly into the atmosphere or into the atmosphere by way of the muffler 12. A thermal overloading of the catalyst 17 or 19 is thus avoided with certainty. If the charging pressure again drops off, then the control valve 13 closes the exhaust-gas by-pass line 15 and all of the exhaust-gases are again conducted by way of the catalyst 17 or 19.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An internal combustion engine with an exhaust-gas line, an exhaust-gas turbo-charger including an exhaust-gas turbine in said exhaust-gas line and a supercharging blower driven by the exhaust-gas turbine, a catalyst in said exhaust-line, an auxiliary by-pass line branching off said exhaust-gas line in by-passing relationship to said exhaust-gas turbine and said catalyst, a control valve means responsive to the charging pressure of air supplied by the supercharging blower to the engine and located between the exhaust gas line and the by-pass line for controlling flow through said by-pass line, and means in communication with said charging pressure for opening said control valve when said charging pressure reaches a predetermined value so as to cause that portion of the exhaust gases which could result in thermal overloading of the catalyst to flow through said by-pass line and around said catalyst.

2. An internal combustion engine according to claim 1, wherein said control valve means directs the exhaust-gas flow through and around said catalyst in an open position and only through said catalyst in a closed position without obstructing flow through said exhaust-gas line in both of said positions.

3. An internal combustion engine according to claim 1, wherein said exhaust-gas line constitutes a principal flow path of a first cross-sectional area, and wherein said auxiliary by-pass line constitutes a secondary flow path of a second cross-section area smaller than said first cross-sectional area.

4. An internal combustion engine according to claim 1, wherein said control valve comprises a valve housing and a closure member connected to a diaphragm in said housing, said closure member being spring-biased toward a position sealing the by-pass line, and wherein said means for opening the control valve comprises a control line, interconnected between the valve housing and an intake for supplying air from said supercharging blower to the engine, for communicating the charging pressure with said diaphragm so as to displace said closure member against said spring-bias when said predetermined value of the charging pressure is reached.

5. An internal combustion engine according to claim 1, characterized in that the catalyst is arranged in the exhaust-gas line upstream of the exhaust-gas turbine.

6. An internal combustion engine according to claim 1, characterized in that the catalyst is arranged in the exhaust-gas line means downstream of the exhaust-gas turbine.

7. An internal combustion engine according to claim 1, characterized in that the control valve means responding to the charging pressure selectively opens and closes the by-pass line means as a function of pressure in the intake manifold.

8. An internal combustion engine according to claim 1, comprising a further by-pass line operable to by-pass the supercharging blower, and further control valve means for selectively opening and closing said further by-pass line means as a function of engine operation.

9. An internal combustion engine according to claim 8, characterized in that the further valve means is opened by the vacuum resulting from closing of the engine throttle valve.

10. An internal combustion engine according to claim 9, characterized in that a muffler is provided, and in that the auxiliary by-pass line means terminates in said muffler in by-passing relationship to the catalyst.

11. An internal combustion engine according to claim 9, characterized in that the catalyst is arranged in the exhaust-gas line upstream of the exhaust-gas turbine.

12. An internal combustion engine according to claim 9, characterized in that the catalyst is arranged in the exhaust-gas line downstream of the exhaust-gas turbine.

* * * * *